United States Patent Office 2,880,154
Patented Mar. 31, 1959

2,880,154

PRODUCTION OF COPOLYMERS OF CHLOROTRIFLUOROETHYLENE AND VINYLIDENE FLUORIDE

Jean W. Borland, Massapequa, and Eugene Schupak, New York, N.Y., assignors to Allied Chemical Corporation, New York, N.Y., a corporation of New York No Drawing. Application November 8, 1954
Serial No. 467,632

4 Claims. (Cl. 204—163)

This invention relates to the manufacture of copolymers of chlorotrifluoroethylene and vinylidene fluoride, and more particularly to the production of such copolymers in homogeneous form.

In the past, copolymers of chlorotrifluoroethylene and vinylidene fluoride have been prepared in the presence of various inorganic or organic polymerization catalysts. However, such methods generally possess the disadvantage of requiring substantially long reaction times. Further, the copolymer products often fail to meet desired specifications because components of the reaction menstrum and reaction conditions exert conflicting influences upon the length of polymer chain and molecular weight. More specifically, the production of such copolymer products as taught by the art are by slow, uneconomical processes which result in formation of non-homogeneous products unacceptable for certain uses.

An object of the present invention is to provide a simple and efficient method for the copolymerization of chlorotrifluoroethylene and vinylidene fluoride to produce a variety of useful copolymers.

Still another object of the present invention is to provide a simple and efficient method for the copolymerization of chlorotrifluoroethylene and vinylidene fluoride to produce a copolymer of relatively high molecular weight which exhibits excellent physical stability and resistance to chemicals.

More specifically, an object of the present invention is to provide a simple and efficient process for the copolymerization of chlorotrifluoroethylene and vinylidene fluoride to produce a homogeneous copolymer.

Various other objects and advantages of the present invention will be apparent to those skilled in the art from the following description and examples.

According to the present invention, copolymers of chlorotrifluoroethylene and vinylidene fluoride are produced by subjecting a mixture of the monomers to the action of gamma rays for a time sufficient to effect not more than about 40% polymerization, and preferably about 5 to 35% polymerization. This procedure enables the polymerization reaction to be much accelerated and, in addition, possesses the outstanding advantage of producing a homogeneous copolymer. A copolymer characterized by homogeneity possesses many advantages, among which may be mentioned superior physical, chemical and electrical properties, e.g. higher resistance to tearing and greater inertness toward solvents.

The temperature at which the polymerization may be carried out varies from about −35° to about +50° C., and preferably about −15° to +15° C. Over the latter range of temperatures polymers of relatively high molecular weight are generally produced. Inasmuch as determination of molecular weights of the copolymers is impractical under normal circumstances, a no-strength-temperature (N.S.T.) test has been used to provide an indication of relative molecular weight in accordance with the procedure outlined on pages 636, 638 and 641 of "Preparation, Properties and Technology of Fluorine and Organic Fluorine Compounds" by Slesser and Schram. Generally speaking, the higher molecular weight polymers have been found to have higher N.S.T. values. We have found that by use of the aforementioned preferred temperature range of about −15° to +15° C., we have usually produced polymers having N.S.T. values in excess of about 325° C.

We have found that the degree of polymerization is dependent upon several factors which include temperature, time and amount of radiation as determined by the strength and position of radiation source. As the temperature or time is increased, the degree of polymerization tends to increase. Further, as the strength of the radiation source is increased or the source is moved closer to the vessel containing the monomer mixture, the rate of polymerization has been found to increase.

In accordance with a preferred embodiment of our invention, chlorotrifluoroethylene is condensed into a valved bomb provided with an insert at its bottom within which a source of radiation can be raised. Vinylidene fluoride is added to the bomb under pressure, and a source of gamma radiation which suitably is Cobalt-60 (a commercial radio-active form of cobalt which emits gamma rays) is raised so that it enters the insert at the bottom of the bomb. The bomb may be provided with any conventional means of agitation, if so desired. Further, if cooling is desired, the bomb may be placed within a suitable cooling bath or coil. After a predetermined period of time, the radiation source is lowered and the bomb removed. The valve on the bomb is opened to release excess monomers which can be recovered and used for subsequent polymerization. The copolymer is then removed from the bomb and heated to approximately 65° C. to insure the removal of excess monomers.

Purification of either chlorotrifluoroethylene or vinylidene fluoride monomer is advantageously carried out by washing the monomer with concentrated sulfuric acid to remove inhibitors, then with a dilute caustic soda solution, e.g. about 10%, to remove any residual acid, and finally passing the monomer through a drying agent such as $P_2O_5$.

The method of the invention is illustrated by the following examples:

*Example 1.*—A stainless steel bomb was charged with a monomer mixture of chlorotrifluoroethylene and vinylidene fluoride. A source of Cobalt-60 was inserted into the bottom of the bomb which was maintained by means of a cooling coil at various temperatures for various exposure times. After removal of unreacted monomers, the copolymer was taken from the bomb and, upon analysis, was shown to be homogeneous. The following results were obtained:

| Temp., °C. | Exposure, Hours | Radiation Strength, curies | Polymerization, percent | Chlorotrifluoroethylene, mol percent | |
|---|---|---|---|---|---|
| | | | | In Monomer Mixture | In Copolymer |
| −35 | 18 | 48 | 30.0 | 18.3 | 38.8 |
| −22 | 10 | 48 | 8.63 | 19.3 | 40.7 |
| −22 | 15 | 48 | 21.0 | 18.8 | 39.4 |
| −10 | 8 | 48 | 12.0 | 19.2 | 39.5 |
| −10 | 20 | 48 | 40.0 | 18.4 | 35.7 |
| −1 | 10 | 48 | 29.5 | 19.0 | 37.7 |
| 25 | 20 | 5 | 11.3 | 19.7 | 39.3 |

*Example 2.*—The same procedure as in Example 1 was used in the following runs except that the mol percentages of chlorotrifluoroethylene in the monomer mixture were varied. Analysis showed the copolymers formed to be homogeneous. The following results were obtained:

| Temp., °C. | Exposure, Hours | Radiation Strength, curies | Polymerization, percent | Chlorotrifluoroethylene, mol percent | |
|---|---|---|---|---|---|
| | | | | In Monomer Mixture | In Copolymer |
| −10 | 10 | 48 | 9.88 | 36.2 | 49.4 |
| −10 | 15 | 48 | 27.8 | 37.7 | 49.1 |
| −10 | 20 | 48 | 35.1 | 36.0 | 48.6 |
| −10 | 10 | 48 | 4.98 | 57.1 | 59.2 |
| −10 | 15 | 48 | 7.12 | 55.8 | 58.4 |
| −10 | 20 | 48 | 13.5 | 58.6 | 59.2 |
| −10 | 6.5 | 48 | 2.01 | 74.3 | 62.5 |
| −10 | 20 | 48 | 8.76 | 72.0 | 60.4 |
| −10 | 30 | 48 | 19.8 | 74.2 | 57.8 |
| −10 | 20 | 48 | 8.53 | 82.3 | 69.6 |
| −10 | 30 | 48 | 17.5 | 86.8 | 69.7 |

As shown by the above examples, copolymers of chlorotrifluoroethylene and vinylidene fluoride produced in accordance with the process of the present invention generally contain a different mol percent ratio of components than found in the monomer mixtures. However, copolymers having desired mol percent ratio of chlorotrifluoroethylene to vinylidene fluoride may be produced with consistency by controlling the mol percent ratio of chlorotrifluoroethylene to vinylidene fluoride in the monomer mixtures. Simple experimentation will determine for each desired copolymer product the mol percentages of the respective monomers to be employed.

The copolymers produced by this invention have a wide range of properties depending upon the relative mol percentages of chlorotrifluoroethylene and vinylidene fluoride in the copolymer. Those having a mol percent ratio of chlorotrifluoroethylene to vinylidene fluoride of about 95 to 10:5 to 90 are chemically resistant but easier to fabricate than the commonly used resistant polymers such as polychlorotrifluoroethylene and polyperfluoroethylene. Those having a mol percent ratio of chlorotrifluoroethylene to vinylidene fluoride of about 95 to 20:5 to 80 possess rubbery characteristics and may be used in place of other elastomers less resistant to chemical action, temperature variations and electricity. Those copolymers having a mol percent ratio of chlorotrifluoroethylene to vinylidene fluoride of 90 to 40:10 to 60 are easily formed into foam rubber-like materials. Generally speaking, the copolymers formed by the process of this invention have been found to exhibit greater resistance to water and organic solvents such as acetone, benzene and ether than the copolymers produced by conventional catalytic procedures.

As variations and modifications may be made in carrying out the processes illustrated without departing from the scope of the invention, it is to be understood that the invention is not to be limited to the specific embodiments thereof except as defined by the appended claims.

We claim:

1. A method of preparing homogeneous copolymers of chlorotrifluoroethylene and vinylidene fluoride which comprises subjecting a mixture of chlorotrifluoroethylene and vinylidene fluoride monomers at a temperature of about −35° to +50° C. to the action of gamma rays for a time sufficient to effect not more than about 40% polymerization, whereby the composition of the copolymer produced is substantially independent of the extent of polymerization.

2. A method of preparing homogeneous copolymers of chlorotrifluoroethylene and vinylidene fluoride which comprises subjecting a mixture of chlorotrifluoroethylene and vinylidene fluoride monomers at a temperature of about −35° to +50° C. to the action of gamma rays for a time sufficient to effect about 5 to 35% polymerization, whereby the composition of the copolymer produced is substantially independent of the extent of polymerization.

3. A method of preparing homogeneous copolymers of chlorotrifluoroethylene and vinylidene fluoride which comprises subjecting a mixture of chlorotrifluoroethylene and vinylidene fluoride monomers to a source of gamma radiation having a strength of at least 5 curies at a temperature of about −35° to +50° C. for a time sufficient to effect about 5 to 35% polymerization, whereby the composition of the copolymer produced is substantially independent of the extent of polymerization.

4. A method of preparing homogeneous copolymers of chlorotrifluoroethylene and vinylidene fluoride which comprises subjecting a mixture of chlorotrifluoroethylene and vinylidene fluoride monomers to a source of gamma radiation having a strength of at least 5 curies at a temperature of about −15° to +15° C. for a time sufficient to effect about 5 to 35% polymerization, whereby the composition of the copolymer produced is substantially independent of the extent of polymerization.

References Cited in the file of this patent

UNITED STATES PATENTS

| 2,631,998 | Pearson | Mar. 17, 1953 |
| 2,668,133 | Brophy et al. | Feb. 2, 1954 |
| 2,752,331 | Dittman et al. | June 26, 1956 |
| 2,752,332 | Honn | June 26, 1956 |

FOREIGN PATENTS

| 511,718 | Belgium | Nov. 28, 1952 |

OTHER REFERENCES

Nature, vol. 143 (1939), page 640.
Nature, vol. 160 (1947), pages 268–269.
Comptes Rendus, vol. 228 (1949), pages 1490–1492.
Comptes Rendus, vol. 229 (1949), pages 827–829.